US007793352B2

(12) United States Patent
Chevalier et al.

(10) Patent No.: US 7,793,352 B2
(45) Date of Patent: *Sep. 7, 2010

(54) SHARING NETWORK ACCESS CAPACITIES ACROSS INTERNET SERVICE PROVIDERS

(75) Inventors: Denis Chevalier, La Colle sur Loup (FR); Gerard Marmigere, Drap (FR); Zsolt Szalai, Tourrettes sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 402 days.

This patent is subject to a terminal disclaimer.

(21) Appl. No.: 12/017,603

(22) Filed: Jan. 22, 2008

(65) Prior Publication Data

US 2008/0141355 A1    Jun. 12, 2008

Related U.S. Application Data

(63) Continuation of application No. 10/720,425, filed on Nov. 24, 2003, now Pat. No. 7,353,405.

(30) Foreign Application Priority Data

Nov. 28, 2002    (EP)    ................... 02368129

(51) Int. Cl.
*G06F 7/04* (2006.01)
*G06F 21/00* (2006.01)
*H04L 9/32* (2006.01)

(52) U.S. Cl. .................. 726/27; 726/2; 713/168; 713/182

(58) Field of Classification Search ............. 726/2, 726/27; 713/168, 182

See application file for complete search history.

(56) References Cited

U.S. PATENT DOCUMENTS

| 5,276,444 | A | 1/1994 | McNair |
| 5,764,890 | A | 6/1998 | Glasser et al. |
| 6,453,301 | B1 | 9/2002 | Niwa |
| 6,754,482 | B1 | 6/2004 | Torabi |
| 6,912,567 | B1 | 6/2005 | Allard et al. |
| 6,973,567 | B1 | 12/2005 | Riley et al. |
| 2002/0133412 | A1 | 9/2002 | Oliver et al. |
| 2002/0169836 | A1 | 11/2002 | Hood et al. |
| 2003/0056096 | A1 | 3/2003 | Albert et al. |
| 2003/0212800 | A1 | 11/2003 | Jones et al. |

*Primary Examiner*—Nasser Moazzami
*Assistant Examiner*—Mohammad W Reza
(74) *Attorney, Agent, or Firm*—Andrea Bauer; Hoffman Warnick LLC

(57) ABSTRACT

For optimizing Internet access resources, an apparatus and computer-like readable medium for sharing network access capacities across Internet service providers is disclosed. According to an apparatus comprising means adapted for carrying out a method for sharing network access capacities between a master Internet service provider, the method of the invention, a client service provider (CSP) may hire accesses to points of presence belonging to a master service provider (MSP) while maintaining a constant security level and providing connection accounting means. When a CSP's subscriber sends an access request to a MSP, the MSP analyzes the subscriber's realm and checks the capacities allocated to the subscriber's CSP. If connection is allowed, the MSP sends an authentication request to the CSP. If the subscriber is authenticated, the MSP launches an accounting process based on the subscriber's realm while the CSP may launch an accounting process associated with the subscriber identifier. Thus, the MSP does not need to maintain a database comprising information relative to the CSP's subscribers.

2 Claims, 5 Drawing Sheets

SHARING NETWORK ACCESS CAPACITIES ACROSS INTERNET SERVICE PROVIDERS

CLAIM OF PRIORITY

This continuation application claims priority to U.S. patent application Ser. No. 10/720,425, entitled METHOD AND SYSTEMS FOR SHARING NETWORK ACCESS CAPACITIES ACROSS INTERNET SERVICE PROVIDERS, filed on Nov. 24, 2003 now U.S. Pat. No. 7,353,405, the contents of which are hereby incorporated by reference in their entirety.

FIELD OF THE INVENTION

The present invention relates generally to the access of distributed computing network environments and more specifically to an apparatus and computer-like readable medium for sharing Internet network access points across Internet Service Providers.

BACKGROUND OF THE INVENTION

Recently, communication between computer systems for data and information exchange has been significantly developing thanks to the Internet, which is known to have rapidly spread on a global level by virtue of being supported by public communication networks, both traditional and technologically advanced ones, such as ISDN, ADSL, GPRS, and others.

Success of this phenomenon is indeed due, also, to the availability, in real time and cheaply, of information and data stored on servers located all over the globe and connected through dedicated digital lines to computers reachable through the various last mile network access services.

As regards the cheapness of operations practicable on the net, it has to be considered that it is directly bound to the cost of the access connection between the user's computer and the access point to the net. More exactly, the network access points are identified, for example by telephone numbers which are made available to the users by each Internet Service Provider (ISP), in order to allow the connection to the provider computers, which are part of the network. As it is known, they store all users' identification data and offer services such as electronic mail, access to sites of the net by assisted, or not, research procedures, memory spaces where each user can put data, commercial news or other information news visible to all users of the net, and more other services.

Thanks to the quality and variety of these services, and also to growing variety of technical tools for access to the net, such as computers, advanced means interfacing TV sets, mobile telephone apparatuses, etc., the number of Internet users has been rapidly increasing. Therefore, it is easily understandable how it can become important to get fast connections to the net through affordable access points, that is, points included in the user's telephone district or area, or in very near areas.

In order to better understand the above difficulties, it has to be considered that according to current connection modalities the user has to choose a specific Internet Service Provider identifying the user according to specific identification data, said Internet Service Provider being associated to an access number, for example a telephone number, stored in memory means of the user's connecting apparatuses to the net. This access number must expediently coincide with the provider's nearest access points to the place where the connecting apparatuses are.

FIG. 1 illustrates schematically the accessing of data on Internet network 100, a distributed computing network environment. The participants in the Internet are a wide variety of machines, organizations, and individuals, all able to communicate and share information. For example, the Internet network 100 includes a plurality of Internet sites 105-1 to 105-q. These Internet sites are generally operated by corporations, universities, and governmental organizations. Each Internet site may include one or more repositories of information and resources that may be accessed over the Internet. Each Internet site, e.g., 105-1 and 105-q, may include a plurality of WEB servers e.g., 110-1 to 110-r and 110'-1 to 110'-n, respectively. Each of these WEB servers may provide a "home page" to be visited, files to be read or downloaded, applications to be shared, and the like.

The Internet network 100 also includes a plurality of points of presence (POPs) 115-1 to 115-s that are operated by Internet service providers (ISPs). These ISPs are in the business of providing Internet access to end-user stations, generically referred to as 120. As mentioned above, the costs of the telephone connection between a user's computer and the access point to the net represent an important part of the Internet connection costs and thus, the geographical locations and distributions of the POPs 115-1 to 115-s are important. For sake of illustration, it is assumed that POPs 115-1 to 115-3 belong to a first geographical location, referred to as 125-1, and POP 115-s belongs to a second geographical location, referred to as 125-2.

As it is apparent from FIG. 1, two problems may arise when a user needs to set a connection with the ISP the user has a supplying contract with. Firstly, if the POP of the ISP is located in the second geographical location 125-2 while the user is momentarily located in the first geographical location 125-1, the communication costs between the user and the point of presence may be prohibitive. Secondly, if the closest POP is over-busy, the user must choose another POP, farther away, which increases communication costs. For example, if POPs 115-3 and 115-s belong to a same ISP and the user is located in the first geographical location 125-1, the user may be forced to set its connection with POP 115-s when POP 115-3 is over-busy. This case may arise even though POPs 115-1 and 115-2 are not over-busy since these POPs may belong to other ISPs.

Likewise, the subscribers of ISPs that do not have enough POPs may experience difficulties establishing connections.

These problems may be avoided by improving geographical distribution of POPs and increasing the number of POPs for each ISP. However, this is not realistic due to the required expenses. As a result, there is a need for a method and systems for sharing points of presence between Internet service providers.

SUMMARY OF THE INVENTION

Thus, it is a broad object of the invention to remedy the shortcomings of the prior art as described above.

It is another object of the invention to provide a method, apparatus, computer-like readable medium, and systems for sharing network access capacities across Internet service providers wherein the security level of Internet service providers is maintained.

It is a further object of the invention to provide a method and systems for sharing network access capacities across Internet service providers wherein the duration of using the shared access capacities, or the number of connections that are established simultaneously, based on shared access capacities, is automatically evaluated.

It is still a further object of the invention to provide a method and systems for controlling shared network access capacities across Internet service providers.

It is still another object of the invention to provide a method and systems for sharing network access capacities across Internet service providers wherein an access request destined to a first service provider is automatically transferred to a second service provider when the access points of the first service provider are over-busy.

The accomplishment of these and other related objects is achieved by a method for sharing network access capacities between a master service provider, comprising at least one point of presence, and a client service provider, said method comprising the steps of:

upon reception of an access request, including at least a subscriber identifier, a service provider identifier and a password, at said at least one point of presence:

determining, according to said service provider identifier, if said access request comes from a subscriber of said master service provider or from a subscriber of said client service provider, said access request being rejected otherwise;

if said access request comes from a subscriber of said master service provider, determining, using said subscriber identifier and said password, if said subscriber is authorized to establish a connection; and, if said subscriber is authorized, establishing a connection, else, rejecting said access request;

else, if said access request comes from a subscriber of said client service provider, determining if a new connection may be established for a subscriber of said client service provider; and, if a new connection may be established, sending an authorization request, comprising at least said subscriber identifier and said password, to said client service provider else, rejecting said access request;

upon reception of an authorization acknowledgment, comprising said subscriber identifier, from said client service provider:

if said subscriber is authorized, establishing a connection else, rejecting said access request Further advantages of the present invention will become apparent to the ones skilled in the art upon examination of the drawings and detailed description. It is intended that any additional advantages be incorporated herein.

DETAILED DESCRIPTION OF THE INVENTION

According to the invention, a Service Provider, typically an Internet Service Provider (ISP) or Application Service Provider (ASP), referred to as "Master SP" or MSP in the following description, owning a large infrastructure, could rent out part of its network access capacity to a third party service provider, referred to as "Client SP" or CSP, having its own infrastructure, that requires additional capacity at peak times or needs to increase geographical coverage through additional Points Of Presence (POP). To maintain a constant security level and provide connection billing basis, the invention is based on the following items:

the Master SP identifies incoming access requests into its network which are really meant for the Client SP in order to route the session appropriately;

the master SP send a request to the Client SP to check authorization of Client SP's subscribers upon incoming access requests of these Client SP's subscribers (information of Client SP's subscribers are not memorized in the Master SP databases)

the Master SP tracks sessions coming in through its POP's and meant for the Client SP in order to bill the Client SP based on actual usage. Usage data collection supports flexibility for the subsequent billing step, which can occur, for instance, based on:

fixed Fee contract based on fixed capacity allocation for simultaneous connection;

total connection time within a defined period of time;

the Master SP controls in real-time the capacity allocated to its Client SP's to prevent impact on the quality of the service offered to its own subscribers;

the Client SP retains the same level of control and ownership on its subscribers' sessions whether they come in through its own or through the Master SP POP.

Figure 1:
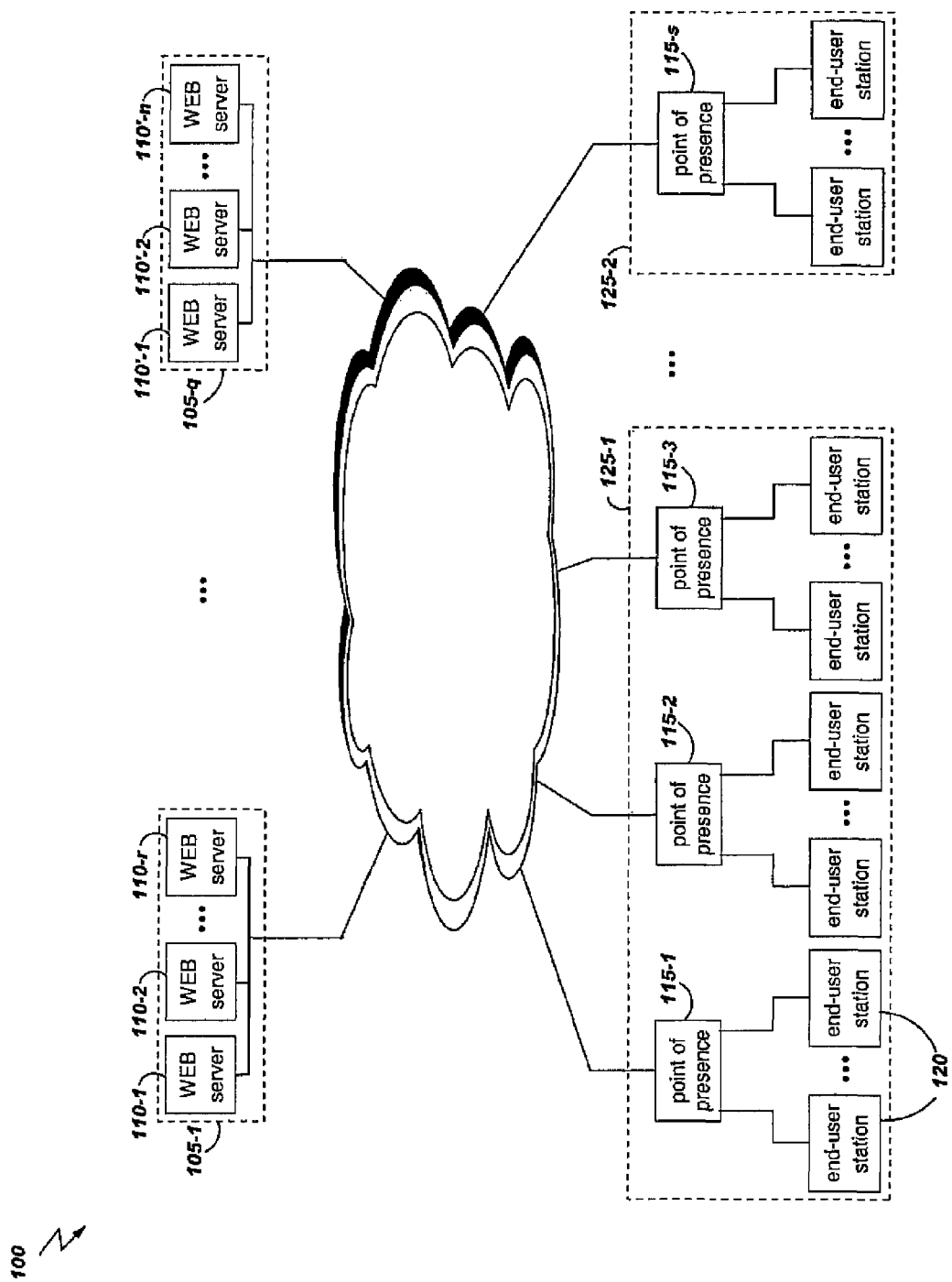
FIG. 1 illustrates schematically the accessing of data on the Internet network, wherein the invention could be implemented.
Figure 2:
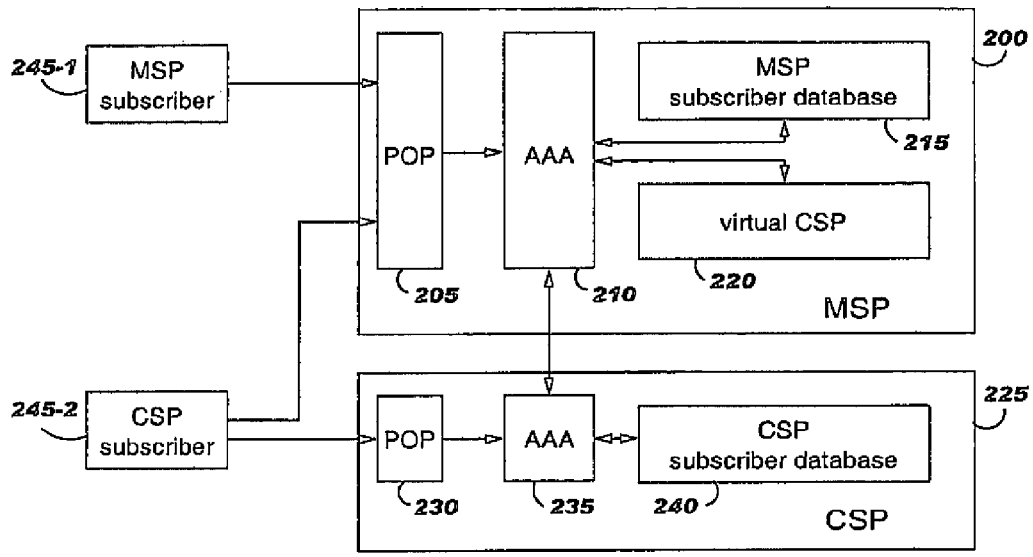
FIG. 2 shows schematically the authentication, authorization and accounting mechanism in the master and client service providers when access requests are received.

The main principle of the invention consists in the creation of a "Virtual Subscriber" that represents Client SPs in the Master SP system, as illustrated in FIG. 2. FIG. 2 illustrates schematically the Authentication, Authorization and Accounting mechanism (AAA) in the Master and Client SPs when access requests are received. Master SP 200 comprises a POP 205, an AAA mechanism 210, a database 215 containing information about its subscribers and a database 220 for virtual subscriber, i.e., Client SPs. Likewise, Client SP 225 comprises a POP 230, an AAA mechanism 235 and a database 240 containing information about its subscribers. A standard Client SP does not contain a database for virtual subscribers. However, it should be noted that a SP may be simultaneously a Master and a Client SP. In such case, the Client/Master SP contains a database for virtual subscribers, i.e., Client SPs of the Client/Master SP.

When a Master SP's subscriber 245-1 requests access to Master SP 200 through POP 205, or when a Client SP's subscriber 245-2 requests access to Client SP 225 through POP 230, AAA mechanisms are used as standard. In such a case, the POP sends a request to the AAA module that compares subscriber information, e.g., subscriber identifier and password, with the ones stored in the subscriber database. If information matches, the connection is established, else, the connection is rejected.

Figure 3:
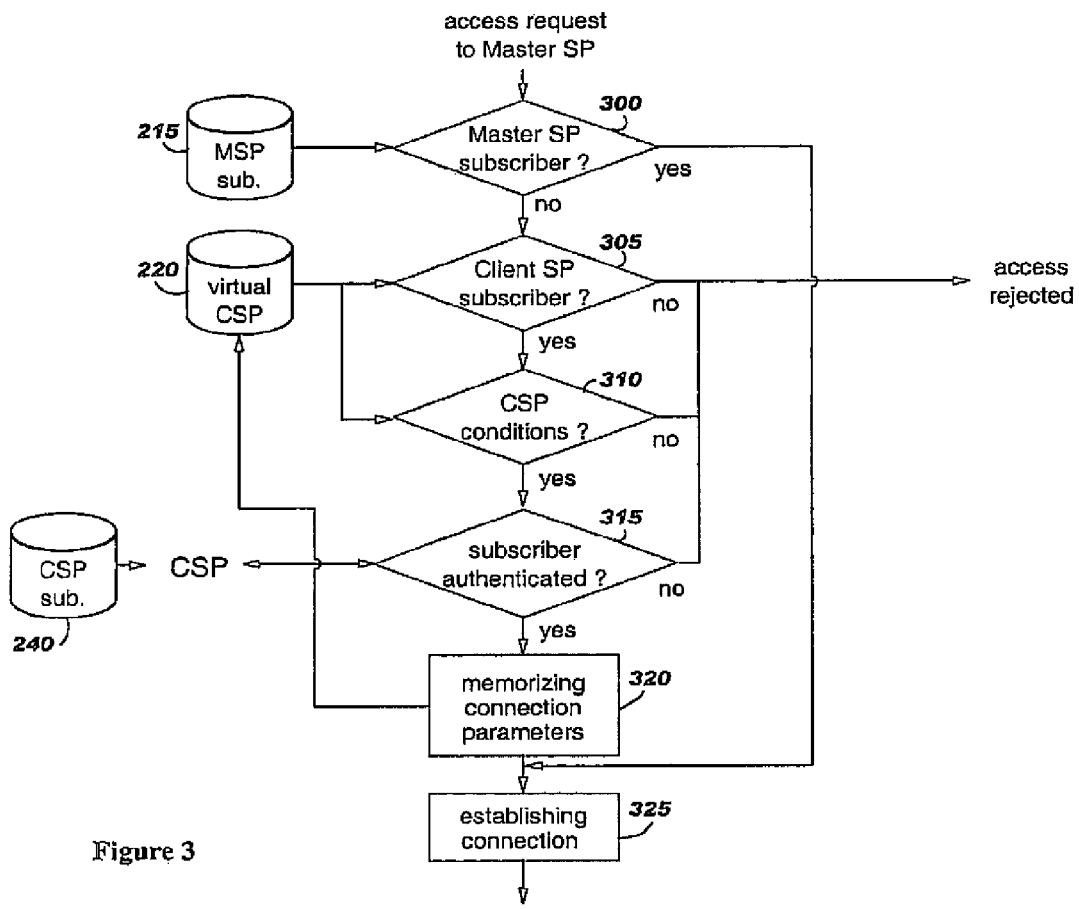
FIG. 3 illustrates an example of the algorithm used for establishing a connection between a subscriber and a master service provider's point of presence.

FIG. 3 illustrates an example of the algorithm used for establishing a connection between a subscriber 245-1 or 245-2 and a POP of the Master SP's 200, according to the invention. When the Master SP 200 receives an access request, a first test is performed to determine if it comes from a Master SP's subscriber (box 300), using the database 215 of Master SP's subscribers. If the access request comes from a Master SP's subscriber, a connection is established (box 325) after this subscriber has been authenticated and authorized. This authentication/authorization is a standard authentication/authorization process, e.g. verifying the password associated to the subscriber identifier using the database 215. Connection parameters may be memorized in database 215 for billing operations or to perform statistics. If the access request does not come from a subscriber of the Master SP, a test is performed to determine whether or not it comes from a subscriber of a Client SP (box 305). This test is done by using the database 220 of the virtual CSPs, by analyzing the subscriber's realm (Master SP does not memorized information relative to Client SP's subscribers). If the realm of the subscriber does not correspond to any Client SP, the access request is rejected. Else, a new test is performed to determine whether or not a subscriber of the corresponding Client SP can establish a connection from the Master SP (box 310). This test, based on the Virtual SP's status, consists in checking access capacities allocated to Client SP 225, e.g., is there enough free ports for the CSP, has the CSP not exceeded his credit threshold, has the MSP not suspended business with CSP? Such Virtual SP's status is memorized in database 220. If a connection is not allowed for reasons related to the Client SP, access request is rejected.

Else, if a connection is allowed, another test is performed to authenticate the subscriber and determine if Client SP authorizes the connection (box 315). To that end, the Master SP sends a request to the Client SP with the information received in the subscriber's request e.g. subscriber identifier and password. As mentioned above, information relative to Client SP's subscriber is not stored in any Master SP database and thus, the Master SP can not authenticate Client SP's subscribers. Using its database 240, the Client SP authenticates the subscriber having sent the access request to the Master SP and forewarns the Master SP whether or not the authentication succeeds. Such authentication process is standard. If the subscriber is not authenticated, the connection is rejected. Else, connection parameters are stored in the database 220 of the virtual SP (box 320) and the connection is established (box 325). These parameters may comprise, for example, the number of connections established for the same Client SP and the connection duration, for purpose of billing Client SP and maintaining the quality of service offered to Master SP's subscribers. On its side, the Client SP stores similar information, relative to the subscriber, for billing subscribers.

Even though Client SP is identified using the realm of the subscriber having sent the request in the previous description, other means may be used such as using the called-number or the name of the network access server when a called-number or a network access server are dedicated to the connection of Client SP's subscribers.

Figure 4:
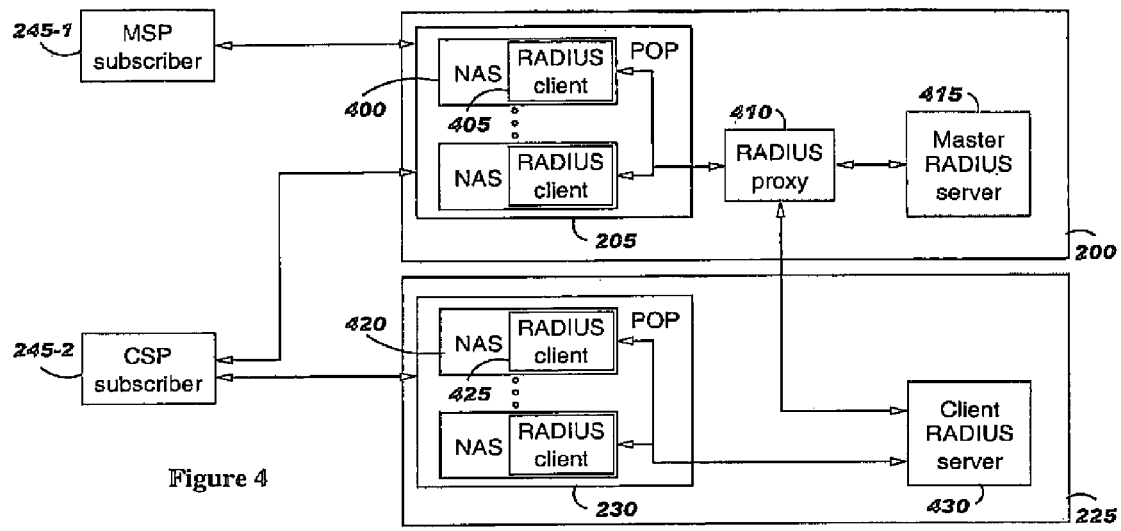
FIG. 4 depicts schematically the implementation of the invention when using RADIUS protocol.

The implementation of the invention may be based on the RADIUS protocol, by creating a RADIUS proxy between the Master SP POP, containing the RADIUS Client, and the Master SP RADIUS server and Client SP RADIUS server, as illustrated on FIG. 4. The RADIUS protocol is described, for example, in "Remote Authentication Dial In User Service (RADIUS)" (Rigney, C., Willens, S., Rubens, A. and W. Simpson, RFC 2865, June 2000) and "RADIUS Accounting" (Rigney, C., RFC 2866, June 2000).

Turning now to FIG. 4 which illustrates schematically the implementation of the invention when using RADIUS protocol, it is shown the Master and Client SPs 200 and 225 as well as MSP and CSP subscribers 245-1 and 245-2 of FIG. 2. Master SP 200 comprises the POP 205 that includes a set of Network Access Servers (NAS), generically referred to as 400. Each NAS 400 controls a plurality of modems (not represented for sake of clarity) that interface subscriber systems to Master SP 200. In this implementation example, each NAS 400 comprises a RADIUS client, generically referred to as 405, to handle subscriber requests. A RADIUS proxy 410 links RADIUS clients 405 to a Master RADIUS server 415 and a Client RADIUS server 430. RADIUS proxy 410 determines which RADIUS server must be accessed. Likewise, Client SP 225 comprises the POP 230 that includes a set of NAS, generically referred to as 420, that interface subscriber systems to Client SP 225. Still for sake of illustration, each NAS 420 includes a RADIUS client, generically referred to as 425. Client RADIUS server 430 may be access either by RADIUS clients 425 or RADIUS proxy 410.

Figure 5:
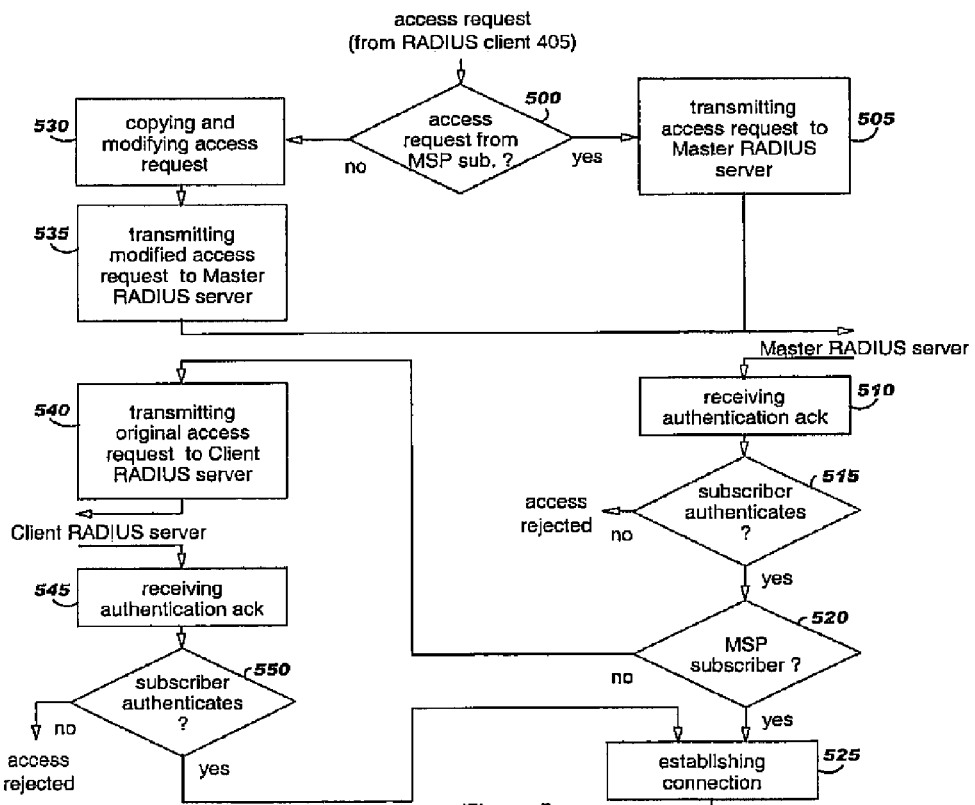
FIG. 5 illustrates an algorithm that may be used in the RADIUS proxy of the invention.

FIG. 5 depicts an algorithm that may be implemented in RADIUS proxy 410. When an access request is received from a RADIUS client 405, a first test is performed to determine whether or not the request is received from a Master SP's subscriber (box 500). If the request has been sent by a Master SP's subscriber, the request is transmitted to the Master RADIUS server 415 (box 505). Upon reception of an authentication acknowledge from the Master RADIUS server (box 510), a second test is performed to determine whether or not the subscriber has been authenticated (box 515). If the subscriber has not been authenticated, the access request is rejected, else, another test is conducted to determine if the subscriber is a Master SP's subscriber or not (box 520). If the subscriber is a Master SP's subscriber, the connection is established and accounting may start (box 525).

If the access request has not been sent by a Master SP's subscriber (box 500), the access request is copied and modified (box 530). The modification of the access request comprises the step of removing the subscriber identifier and password that are replaced by a virtual subscriber identifier and password. A couple of virtual subscriber identifier and password is assigned to each Client SP of the Master SP 200, according to the realm. Then, the modified access request is transmitted to the Master RADIUS server 415 (box 535). Upon reception of an authentication acknowledgment from the Master RADIUS server (box 510), the second previous test is performed to determine whether or not the (virtual) subscriber has been authenticated (box 515). If the (virtual) subscriber has not been authenticated, the access request is rejected, else, the other test is conducted to determine if the subscriber is a Master SP's subscriber or not (box 520). If the subscriber is not a Master SP's subscriber, the original access request is transmitted to Client RADIUS server 430 for subscriber authentication purposes (box 540). Upon reception of an authentication acknowledgment from the Client RADIUS server (box 545), a test is performed to determine whether or not the subscriber is authenticated (box 550). If the subscriber is not authenticated, the access request is rejected. In such case, the virtual subscriber identifier and password are replaced by the real ones before the reject access message is transmitted to the NAS. Else, if the subscriber is authenticated, the connection is established and accounting, e.g., connection duration and number of connections established for corresponding Client SP, may start (box 525).

As mentioned above, determining if a subscriber is a Master SP' subscriber or a Client SP's subscriber may be based on subscriber's realm or any equivalent information.

FIGS. 6 to 9 illustrates timing analysis examples of connection process based on the algorithm described by reference to FIG. 5.

Figure 6:
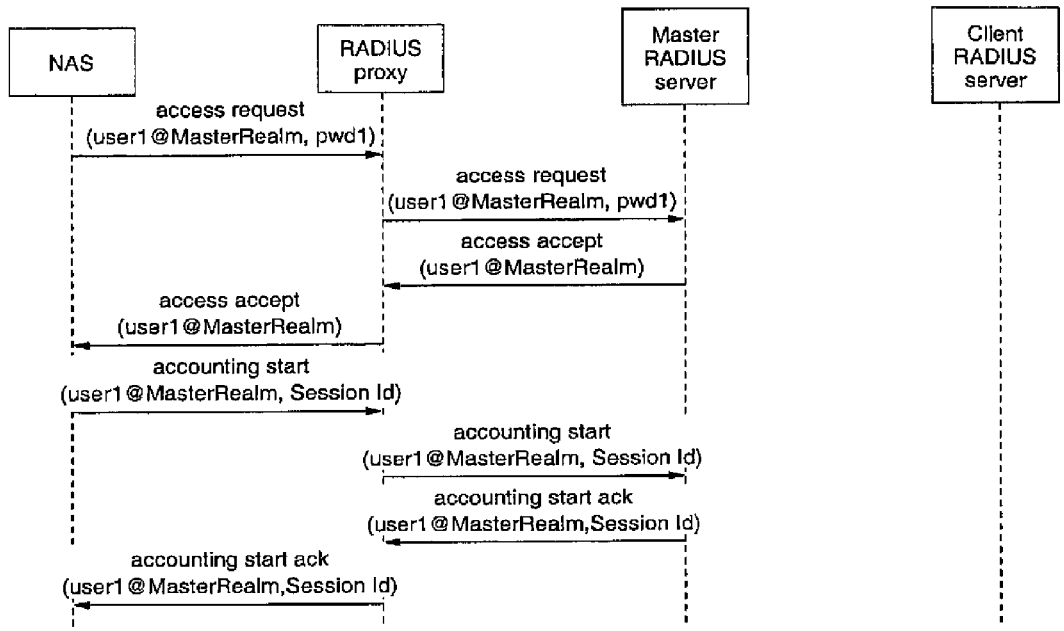
FIG. 6 to 9 show timing analysis examples of a connection process based on the algorithm of FIG. 5.

FIG. 6 depicts a first connection example concerning a Master SP's subscriber when connection is accounted for billing the subscriber. When receiving the access request from the subscriber, the NAS transmits the access request with the subscriber identifier (comprising a name and the Master's realm) and the password to the RADIUS proxy. After having determined that access request has been sent by a Master SP's subscriber, the RADIUS proxy transmits this access request comprising subscriber identifier and password to the Master RADIUS server for authenticating the subscriber. If the Master RADIUS server authenticates the subscriber, an access accept message is transmitted back to the RADIUS proxy. Upon reception of the access accept message, the RADIUS proxy forwards this access accept message to the NAS. Then, the NAS sends an accounting start request with the subscriber and session identifiers to the RADIUS proxy. After having determined that accounting request concerns a Master SP's subscriber, the RADIUS proxy transmits this request with the subscriber and session identifiers to the Master RADIUS server. The Master RADIUS server launch an accounting process associated to this subscriber and sends back an accounting start acknowledgment message comprising the subscriber and session identifiers to the RADIUS proxy. This accounting start acknowledgment message comprising the subscriber and session identifiers is then transmitted to the NAS.

Figure 7:
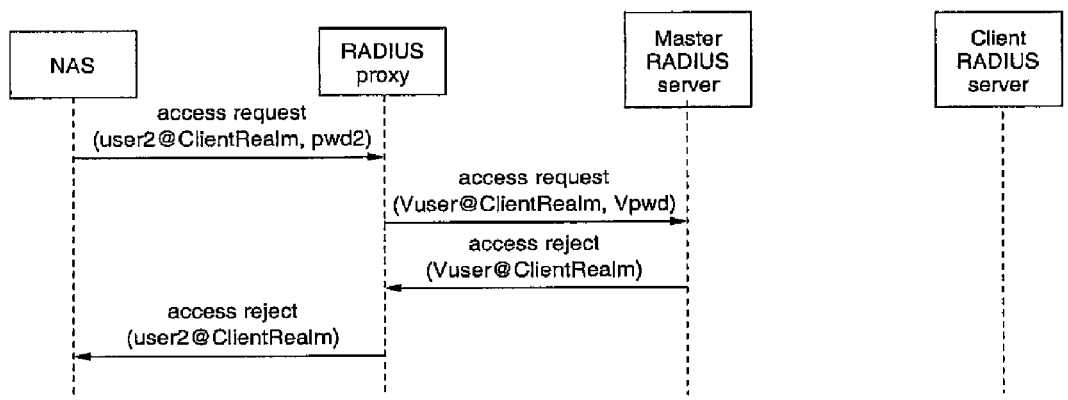

FIG. 7 illustrates a second connection example concerning a Client SP's subscriber when connection is rejected by the Master SP. The connection may be rejected by Master SP for reasons explained above, e.g., the subscriber's realm does not correspond to a Client SP or there is no free port for the corresponding Client SP. When receiving the access request from the subscriber, the NAS transmits the access request with the subscriber identifier (comprising a name and a realm) and the password to the RADIUS proxy. The RADIUS proxy copies the access request and modifies it to replace the subscriber identifier and password by virtual subscriber identifier and password associated to the subscriber's realm. If there is no virtual subscriber identifier and password associated with the subscriber's realm, this means that the service provider of this subscriber is not a client of the Master SP. In such case, the access request is rejected by the RADIUS proxy. If there is a virtual subscriber identifier and password associated with the subscriber's realm, which is the case in this example, the modified access request is then transmitted to the Master RADIUS server. The Master RADIUS server checks access capacities allocated to Client SP. If the Client SP is not allowed to create a new connection, the Master RADIUS server sends back an access reject message comprising the virtual subscriber identifier to the RADIUS proxy. The RADIUS proxy transmits this access reject message to the NAS after having replaced the virtual subscriber identifier by the subscriber identifier.

Figure 8:
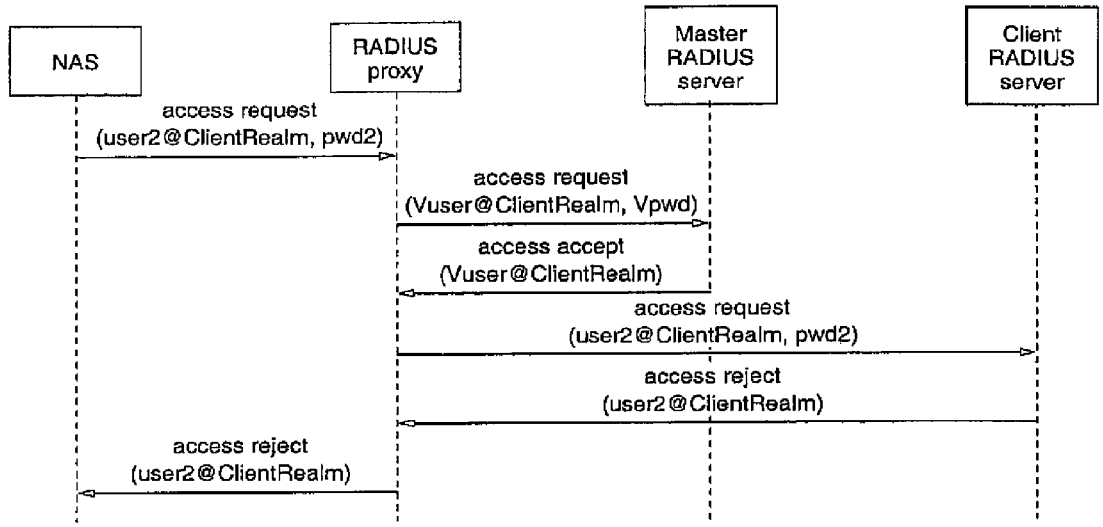

FIG. 8 illustrates a third connection example concerning a Client SP's subscriber when connection is accepted by the Master SP but rejected by the Client SP. When receiving the access request from the subscriber, the NAS transmits the access request with the subscriber identifier (comprising a name and a realm) and the password to the RADIUS proxy. The RADIUS proxy copies the access request and modifies it to replace the subscriber identifier and password by a virtual subscriber identifier and password associated with the subscriber's realm. If there is virtual subscriber identifier and password associated with the subscriber's realm, which is the case in this example, the modified access request is then transmitted to the Master RADIUS server. The Master RADIUS server checks access capacities allocated to Client SP. If the Client SP is allowed to create a new connection, the Master RADIUS server sends back an access accept message, comprising the virtual subscriber identifier, to the RADIUS proxy. The RADIUS proxy then transmits the original access request with the subscriber identifier and password to the Client RADIUS server. If the Client RADIUS server does not authenticate the subscriber, an access reject message comprising the subscriber identifier is transmitted back to the RADIUS proxy. The RADIUS proxy sends this access reject message comprising the subscriber identifier to the NAS.

Figure 9:
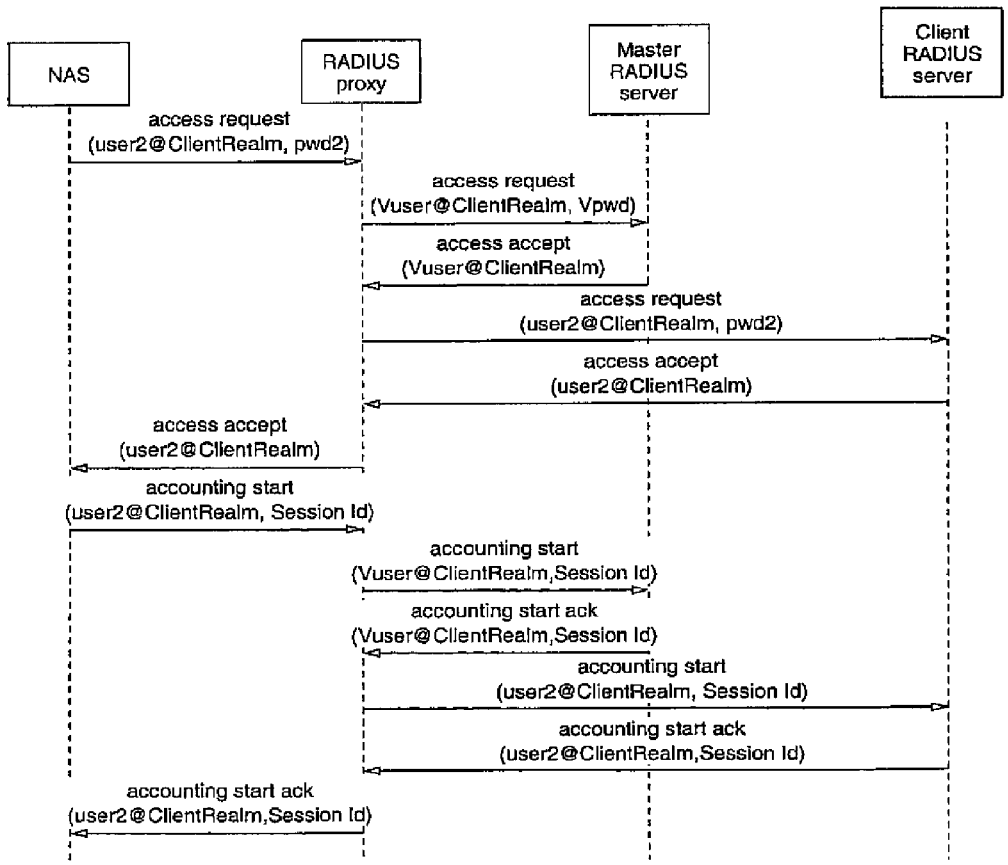

FIG. 9 illustrates a fourth connection example concerning a Client SP's subscriber when connection is established (accepted by both Master and Client SPs) and accounted for billing the Client SP and the subscriber. When receiving the access request from the subscriber, the NAS transmits the access request with the subscriber identifier (comprising a name and a realm) and the password to the RADIUS proxy. The RADIUS proxy copies the access request and modifies it to replace the subscriber identifier and password by a virtual subscriber identifier and password associated with the subscriber's realm. If there is virtual subscriber identifier and password associated with the subscriber's realm, which is the case in this example, the modified access request is then transmitted to the Master RADIUS server. The Master RADIUS server checks access capacities allocated to Client SP. If the Client SP is allowed to create a new connection, the Master RADIUS server sends back an access accept message, comprising the virtual subscriber identifier, to the RADIUS proxy. The RADIUS proxy then transmits the original access request with the subscriber identifier and password to the Client RADIUS server. If the Client RADIUS server authenticates the subscriber, an access accept message comprising the subscriber identifier is transmitted back to the RADIUS proxy. The RADIUS proxy sends this access accept message comprising the subscriber identifier to the NAS that sends an accounting start message comprising the subscriber and session identifiers to the RADIUS proxy. The RADIUS proxy copies the accounting start message and modifies it to replace the subscriber identifier □by a virtual subscriber identifier associated with the subscriber's realm. The modified accounting start message is then transmitted to the Master RADIUS server. The Master RADIUS server launches the accounting process corresponding to the Client SP associated to the subscriber and sends back an accounting start acknowledgment message comprising the virtual subscriber and session identifiers to the RADIUS proxy. The RADIUS proxy then transmits the original accounting start message with the subscriber and session identifiers to the Client RADIUS server. The Client RADIUS server launches the accounting process corresponding to the subscriber and sends back an accounting start acknowledge message comprising the subscriber and session identifiers to the RADIUS proxy. The RADIUS proxy transmits this accounting start acknowledgment message comprising the subscriber and session identifiers to the NAS.

The method and systems of the invention may be used in conjunction with telephone switching equipment having hunting features. Hunting features automatically route calls directed to an initial group of □lines, when all the lines of this initial group are busy, to other line(s) in a predetermined group. Thus, when a subscriber of a Client SP initializes a call to a Client SP's POP, using a particular called-number, the call may be automatically transmitted to a Master SP's POP, having another called-number, if this particular called-number is busy. In such case, the subscriber does not need to re-dial another called number and so, does not need to store all the called-numbers of the Master SPs renting access capacities to the subscriber's CSP.

Naturally, in order to satisfy local and specific requirements, a person skilled in the art may apply to the solution described above many modifications and alterations all of which, however, are included within the scope of protection of the invention as defined by the following claims.

The invention claimed is:

1. A method for sharing network access capacities between a master Internet service provider, comprising at least one point of presence, and a client Internet service provider, said method comprising the steps of:
   upon reception of an access request, including at least a subscriber identifier, an Internet service provider identifier and a password, at said at least one point of presence:
   determining, according to said Internet service provider identifier, if said access request comes from a subscriber of said master Internet service provider or from a subscriber of said client Internet service provider, said access request being rejected otherwise;
   if said access request comes from a subscriber of said master Internet service provider,
   determining, using said subscriber identifier and said password, if said subscriber is authorized to establish a connection; and,
   if said subscriber is authorized, establishing a connection, else, rejecting said access request;
   else, if said access request comes from a subscriber of said client Internet service provider,
   determining if a new connection may be established for a subscriber of said client Internet service provider; and, if a new connection may be established, sending an authorization request, comprising at least said subscriber identifier and said password, to said client Internet service provider, else, rejecting said access request;
   upon reception of an authorization acknowledgment, comprising said subscriber identifier, from said client Internet service provider:
   if said subscriber is authorized, establishing a connection, and sharing network access capacity across the established connection between the master Internet service provider and the client Internet service provider
   else, rejecting said access request; and
   replacing said subscriber identifier and said password by a virtual subscriber identifier and a virtual password, associated to said Internet service provider identifier, when said access request comes from a subscriber of said client Internet service provider, before determining if a new connection may be established for a subscriber of said client Internet service provider.

2. A non-transitory computer readable medium comprising instructions for carrying out a method for sharing network access capacities between a master Internet service provider, comprising at least one point of presence, and a client Internet service provider, said method comprising the steps of:
   upon reception of an access request, including at least a subscriber identifier, an Internet service provider identifier and a password, at said at least one point of presence:
   determining, according to said Internet service provider identifier, if said access request comes from a subscriber of said master Internet service provider or from a subscriber of said client Internet service provider, said access request being rejected otherwise;
   if said access request comes from a subscriber of said master Internet service provider,
   determining, using said subscriber identifier and said password, if said subscriber is authorized to establish a connection; and,
   if said subscriber is authorized, establishing a connection, else, rejecting said access request;
   else, if said access request comes from a subscriber of said client Internet service provider,
   determining if a new connection may be established for a subscriber of said client Internet service provider; and,
   if a new connection may be established, sending an authorization request, comprising at least said subscriber identifier and said password, to said client Internet service provider, else, rejecting said access request;
   upon reception of an authorization acknowledgment, comprising said subscriber identifier, from said client Internet service provider:
   if said subscriber is authorized, establishing a connection, and Sharing network access capacity across the established Connection between the master Internet service provider and the client Internet service provider
   else, rejecting said access request; and
   replacing said subscriber identifier and said password by a virtual subscriber identifier and a virtual password, associated to said Internet service provider identifier, when said access request comes from a subscriber of said client Internet service provider, before determining if a new connection may be established for a subscriber of said client Internet service provider.

* * * * *